United States Patent [19]

Paul et al.

[11] Patent Number: 5,137,949
[45] Date of Patent: Aug. 11, 1992

[54] POLYDIORGANOSILOXANE-POLYCARBONATE BLOCK CO-CODENSATES WITH IMPROVED PROTECTION AGAINST UV LIGHT

[75] Inventors: Winfried Paul; Hans-Josef Buysch, both of Krefeld; Wolfgang Nising, St. Augustin; Thomas Scholl, Meerbusch, all of Fed. Rep. of Germany

[73] Assignee: Bayer Aktiengesellschaft, Leverkusen, Fed. Rep. of Germany

[21] Appl. No.: 604,713

[22] Filed: Oct. 26, 1990

Related U.S. Application Data

[63] Continuation of Ser. No. 166,869, Mar. 11, 1988, abandoned.

[30] Foreign Application Priority Data

Mar. 25, 1987 [DE] Fed. Rep. of Germany ....... 3709779

[51] Int. Cl.$^5$ ............................................ C08K 5/3445
[52] U.S. Cl. ......................................... 524/91; 524/87
[58] Field of Search ............................................ 524/91

[56] References Cited

U.S. PATENT DOCUMENTS

| | | | |
|---|---|---|---|
| 3,189,662 | 6/1966 | Vaughn | 266/82.4 |
| 3,892,889 | 7/1975 | Cohnen et al. | 427/160 |
| 3,936,305 | 2/1976 | Hiraishi et al. | 96/84 UV |
| 4,085,089 | 4/1978 | Irick, Jr. et al. | 260/45.8 NT |
| 4,584,360 | 4/1986 | Paul et al. | 528/14 |
| 4,600,632 | 7/1986 | Paul et al. | 428/220 |
| 4,684,679 | 8/1987 | Kubota et al. | 524/91 |
| 4,684,680 | 8/1987 | Kubota et al. | 524/91 |
| 4,707,393 | 11/1987 | Vetter | 428/178 |

FOREIGN PATENT DOCUMENTS

| | | |
|---|---|---|
| 146360 | 11/1972 | Czechoslovakia . |
| 247480 | 5/1987 | European Pat. Off. . |
| 1670951 | 2/1971 | Fed. Rep. of Germany . |
| 50-161538 | 12/1975 | Japan . |
| 1171888 | 3/1968 | United Kingdom . |

OTHER PUBLICATIONS

Taschenbuch der Kunststoffadditives, V. R. Gachter, H. Muller, Carl Hauser Verlag, 1983, p. 153 et seq.
B. M. Beach, R. P. Kambour, A. R. Schultz, Journal of Polymer Science, Polymer Letters, Edition 12, p. 247, 1974.
Chemical Abstract 74, 53666f (1971).
Chemical Abstract 77, 62720h (1972).

*Primary Examiner*—John C. Bleutge
*Assistant Examiner*—R. Dean, Jr.
*Attorney, Agent, or Firm*—Joseph C. Gil; Aron Preis

[57] ABSTRACT

A thermoplastic molding composition is disclosed comprising a polydiorganosiloxane-polycarbonate block cocondensate and 0.5% to 15% by weight of a particular hydroxy benzotriazole. The composition is characterized by its improved protection against UV light.

2 Claims, No Drawings

POLYDIORGANOSILOXANE-POLYCARBONATE BLOCK CO-CODENSATES WITH IMPROVED PROTECTION AGAINST UV LIGHT

This application is a continuation of application Ser. No. 07/166,869 filed Mar. 11, 1988, now abandoned.

This invention relates to polydiorganosiloxane-polycarbonate block cocondensates which are characterized in that they contain hydroxybenzotriazoles corresponding to the following Formula I

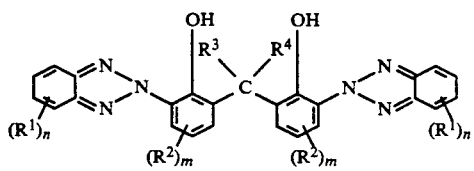

wherein
$R^1$ and $R^2$ are identical or different and denote H, halogen, $C_1$–$C_{10}$ alkyl, $C_5$–$C_{10}$ cycloalkyl, $C_7$–$C_{13}$ aralkyl, $C_6$–$C_{14}$ aryl, O—$R^5$ or COOR$^5$, in which $R^5$=H or $C_1$–$C_4$ alkyl, and
$R^3$ and $R^4$, which may be identical or different, denote H, $C_1$–$C_4$ alkyl, $C_5$–$C_6$ cycloalkyl, benzyl or $C_6$–$C_{14}$ aryl,
m stands for 1, 2 or 3 and
n stands for 1, 2, 3 or 4.

Preferred groups $R^1$ are H, Cl and $CH_3$; preferred groups $R^2$ are H, $C_1$–$C_{10}$ alkyl, cyclohexyl, $C_7$–$C_9$ aralkyl, phenyl and naphthyl, preferred groups $R^3$ and $R^4$ are H and $C_1$–$C_4$ alkyl; the preferred value for m is 1, and the preferred value for n is also 1.

Particularly preferred compounds I are those in which $R^1$=H, $R^2$=H or $C_1$–$C_9$ alkyl, $R^3$=H, $R^4$=H, m=1 and n=1.

Under weathering conditions, in the presence of air, moisture and light and especially UV light, thermoplastic polycarbonates undergo degradation, as can be seen from the deterioration in their mechanical properties such as impact strength, notched impact strength and breaking resistance under multi-axial stresses and the impairment in optical properties, e.g. the loss in surface gloss and transmission as well as yellowing.

It is known that aromatic polycarbonates may be protected against degradation caused by UV radiation under weathering conditions by using UV absorbents of the type of hydroxybenzotriazoles of Formula II, for example those corresponding to formulae IIa or IIb.

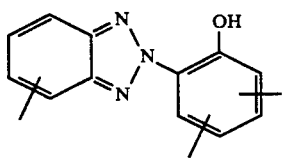

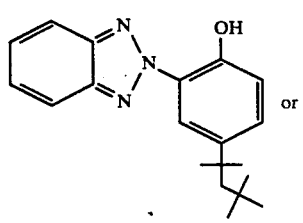

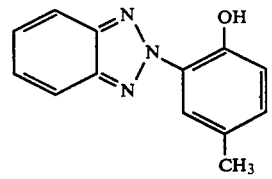

2-(2'-Hydroxy-4'-tert, octylphenyl)-benzotriazole.

2-(2'-Hydroxy-4'-methyl-phenyl)-benzotriazole

It has been found that polydiorganosiloxane-polycarbonate block copolymers which are initially colourless, and which are recommended for the manufacture of large covering panels by means of extruders by virtue of their great toughness even after exposure to weathering, undergo yellowing more rapidly than straight chained homopolycarbonates under the same conditions in the presence of the same hydrozybenzotriazole UV absorbents conventionally used.

Polydiorganosiloxane-polycarbonate block cocondensates have been disclosed, for example, in U.S. Pat. No. 3,189,662. Their improved mechanical properties at low temperatures has been described in the relevant literature (e.g. B. M. Beach, R. P. Kamoour and A. R. Schultz, J. Polymer Sci., Polymer Lett. Ed. 12, 247 (1974).

The use of UV absorbents in polydiorganosiloxane-polycarbonate block concondensates is known from U.S. Pat. No. 4,600,632 (Le A 23 811).

It has now been found that benzotriazolederivatives having the structure I improve the protection of polydiorganosiloxane-polycarbonate block cocondensates against the effect of UV light, especially as regards yellowing.

This is all the more surprising in view of the fact that when used in straight chained homopolycarbonates, the stabilizers of formula I do not differ in their protective action from the commonly used representatives of this class of compounds.

There was therefore no apparent reason to replace conventional benzotriazole UV absorbents by those corresponding to formula I.

Hydroxy benzotriazoles having the structure corresponding to formula I are known, and their preparation has been described in DOS 1 670 951 and in Czech Patent specification 146 360. Compared with hydroxybenzotriazoles of formula II, they are distinguished by their exceptionally high resistance to sublimation, i.e. their low volatility at high temperatures.

The polydiorganosiloxane-polycarbonate block cocondensates which are to be stabilized according to the invention have a relative viscosity (determined on a solution of 0.5 g of the block cocondensate in 1 dl of dichloromethane at 25° C.) of from 1.15 to 1.38, preferably from 1.20 to 1.35, and they contain from 0.5 to 10% by weight, preferably from 1 to 7% by weight of polydiorganosiloxane units, these units containing on average from 5 to 100, preferably from 10 to 80 silicon atoms per unit.

Preferred block cocondensates contain diorganosiloxane units corresponding to the formula

wherein R and $R^6$ denote, independently of one another, $C_1$-$C_{20}$, preferably $C_1$-$C_6$ alkyl, $C_6$-$C_{14}$, preferably $C_6$ aryl, in which alkyl and aryl groups one or more carbon atoms, up to all the carbon atoms, may be substituted by fluorine, chlorine or bromine.

The preferred groups R and $R^6$ include ethyl, propyl, n- and tert.-butyl, chloromethyl, trifluoropropyl, phenyl, chlorophenyl, naphthyl, and especially methyl.

From 90 to 99.5% by weight, preferably from 93 to 99% by weight of the block cocondensate A consists of carbonyl groups, diphenol groups, optionally residues of branching agents and optionally end groups.

Preferred diphenol groups may correspond, for example, to the following formulae:

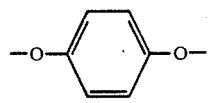

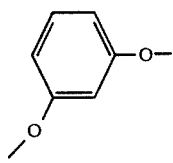

and

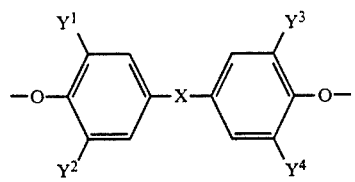

wherein
X denotes a single bond,

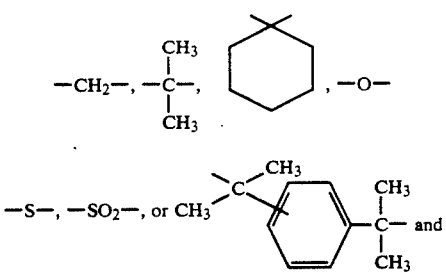

$Y^1$ to $Y^4$ denote, independently of one another, hydrogen, $C_1$-$C_4$ alkyl, preferably methyl, or halogen, preferably chlorine or bromine.

The following groups are examples of preferred diphenol groups:
2,2-bis-(4-hydroxyphenyl)-propane,
1,1-bis-(4-hydroxyphenyl)-cyclohexane,
2,2-bis-(3,5-dichloro-4-hydroxyphenyl)-propane,
2,2-bis-(3,5-dimethyl-4-hydroxyphenyl)-propane,
bis-(3,5-dimethyl-4-hydroxyphenyl)-ethane,
bis-(3,5-dimethyl-4-hydroxyphenyl)-methane and
bis-(4-hydroxyphenyl)-sulphide.

Preferred branching agents for the block cocondensates are compounds which are at least trifunctional, such as those described e.g. in DE-OS 1 570 533 and 1 595 762 and in U.S. Pat. No. 3,544,514; preferably trihydric phenols, aromatic tricarboxylic acids and hydroxycarboxylic acids containing at least three functional groups. The following are examples of preferred branching agents:
2,4-bis-(4-hydroxyphenyl-isopropyl)-phenol,
2,6-bis-(2'-hydroxy-5'-methylbenzene)-4-methylphenol,
2-(4-hydroxyphenyl)-2-(2,4-dihydroxyphenyl)-propane,
1,4-bis-(4,4'-dihydroxytriphenyl-methyl)-benzene,
2,4-dihydroxybenzoic acid, trimesic acid, cyanuric chloride,
3,3-bis-(4-hydroxyphenyl)2-oxo-2,3-dihydro-indole
3,3-bis-(4-hydroxy-3-methyl-phenyl)-2-oxo-2,3-dihydroindole.

If the block cocondensates are to be used in a branched form, the number of branching groups is generally from 0.05 to 2 mol %, based on the diphenol groups of the block cocondensate.

Preferred end groups for the block co-condensates are residues of phenol, benzoic acid, mono- and dialkyl phenols and mono- and dialkyl benzoic acids, in which the alkyl substituents may carry a total of up to 20 carbon atoms per end group. Particularly preferred end groups correspond to the following formula VII:

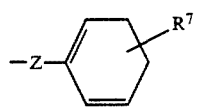

wherein Z denotes O or

and $R^7$ denotes H or $C_1$-$C_{15}$ alkyl.

Examples of preferred end groups include the residues of phenol, p-tert.-butyl-phenol, p-isooctyl-phenol, p-nonylphenol, 3,5-di-tert.-butyl-phenol, 2-(3,5-dimethylheptyl)-phenol and 4-(3,5-dimethylheptyl)-phenol.

The halogen carbonic acid esters of phenols may be used instead of the free phenols and the acid chlorides of carboxylic acids may be used instead of the acids.

The quantities of end groups are preferably from 1 to 10 mol %, based on the diphenol groups of the block cocondensate.

The block cocondensates A may be prepared, for example, from α,ω-bis(hydroxyaryloxy)-polydiorganosiloxanes, bisphenols, carbonic acid derivatives, e.g. phosgene, optionally chain breaking agents and optionally branching agents by the diphasic interface process under the usual conditions. The transesterification process and the so called pyridine process are also suitable for their preparation.

The reaction conditions for this process are those conventionally employed.

The number of silicone atoms per unit (=average siloxane block length) may be determined in the process of preparation by determining the end groups on the polysiloxane starting material.

Saponification of the polycarbonate part of the block cocondensate enables the degree of polymerisation of the siloxane blocks on the block cocondensate to be determined. The unsaponifiable siloxane block then becomes accessible to polymer analytical investigations (GPC, HPLC, end group determination).

The resin to be stabilized may also be a mixture of conventional thermoplastic polycarbonates which are free from polysiloxane and have a relative viscosity of from 1.15 to 1.38 and a polydiorganosiloxane-polycarbonate block cocondensate with a relative viscosity of from 1.15 to 2.5 in such proportions that the total quantity of polydiorganosiloxane units, based on the total weight of the resin, is again from 0.5 to 10% by weight, preferably from 1 to 7% by weight.

When the resin is a mixture of polycarbonates containing siloxane groups and polycarbonates free from siloxane, the polycarbonates containing siloxane may contain more than 10% by weight of polydiorganosiloxane units, provided the quantity of polydiorganosiloxane units is again from 0.5 to 10% by weight after the siloxane-containing polycarbonates have been mixed with polycarbonates free from siloxane.

According to the invention, from 0.05% by weight to 15% by weight, preferably from 0.2 to 10% by weight of UV absorbents of formula I are added to the resins, according to the invention. They are incorporated with the resins by means of the usual mixing apparatus such as rollers, kneaders or single shaft or multi shaft extruders.

Other additives of the usual type, such as reinforcing materials and fillers, flame retardants, dyes and pigments and lubricants and mould release agents may also be added to the resin.

The present invention therefore also relates to a process for the stabilization of polydiorganosiloxane-polycarbonate block cocondensates, characterized in that from 0.05 to 15% by weight, preferably from 0.2 to 10% by weight of UV absorbents of formula I and optionally reinforcing materials, fillers, flame retardants, dyes, pigments, lubricants and/or mould release agents are incorporated with the polydiorganosiloxane-polycarbonate block cocondensates by means of the usual mixing apparatus such as rollers, kneaders, single shaft extruders or multi shaft extruders.

Glass fibres are preferred reinforcing materials.

Resins which have been stabilized as described above may be worked up in known manner into fibres, films, plates and injection moulded or extruded articles. Extrusion may be employed, for example, for the production of solid plates or multiple web plates which are used as glazing panels for the construction of high rise buildings and greenhouses. According to the invention, resins containing from 0.05 to 1% by weight, preferably from 0.2 to 0.8% by weight of UV absorbents of formula I are used for this purpose.

Another application of the polydiorganosiloxane copolycarbonates which are stabilized against UV light according to the invention is the production of multi layered plastics panels by the (multiple) coextrusion process in which the weight bearing central layer consists of a plastics material, e.g. ABS, straight chained or branched poly styrene or a thermoplastic polycarbonate, preferably polydiorgano siloxane- polycarbonate block cocondensates, and UV absorption layers of polydiorganosiloxane-polycarbonate block cocondensates containing from 1 to 15% by weight, preferably from 5 to 10% by weight of the UV absorbent of Formula I. are applied to one or both sides of the central layer.

The thickness of the UV absorption layer should be from 10 to 50 μm, preferably from 20 to 40 μm.

Another covering layer from 10 to 30 μm in thickness, preferably from 10 to 20 μm, substantially free from UV absorbents may be applied to the UV absorption layer on the side remote from the central layer.

The processes and apparatus employed for simple and multiple coextrusion are known from DE-OS-2,832,676.

The application of a UV absorption layer containing a UV absorbent which is volatile at high temperatures is known from EP-OS 110 238.

The present invention therefore also relates to the use of the polydiorganosiloxane-polycarbonate block cocondensates according to the invention for the manufacture of plates such as solid plates or multiple web plates containing from 0.05 to 1% by weight, preferably from 0.2 to 0.8% by weight of hydroxybenzotriazole of formula I.

The present invention in addition relates to the use of the polydiorganosiloxane-polycarbonate block cocondensates according to the invention for the manufacture of multi layered plastics panels in which the thicknesses of the UV absorption layers are from 10 to 50 μm, preferably from 20 to 40 μm, and the quantity of hydroxybenzotriazole of formula I contained in the UV absorption layer is from 1 to 15% by weight, preferably from 5 to 10% by weight.

The present invention also relates to a process for the production of multi-layered plastics panels by the (multiple) coextrusion process, characterized in that the weight bearing central layer consists of a thermoplastic resin and UV absorption layers of polydiorganosiloxanepolycarbonate block cocondensates containing from 1 to 15% by weight, preferably from 5 to 10% by weight of UV absorbents of formula I and having a thickness of from 10 to 50 μm, preferably from 20 to 40 μm are applied in known manner to one or both sides of the central layer.

EXAMPLES

UV Absorbent 1

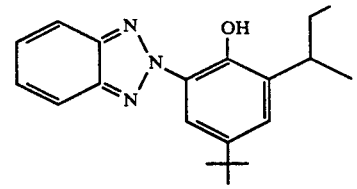

UV Absorbent 2

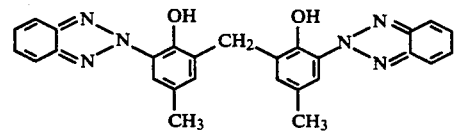

The linear homopolycarbonate A employed was a polycarbonate based on bisphenol A which had been regulated by means of phenol as chain breaking agent and had a relative solution viscosity of 1.29 (determined at 25° C. in a 0.5% solution in dichloromethane).

The polydiorganosiloxane-polycarbonate block co-condensate B was a copolycarbonate based on bisphenol A and 5% by weight of polydimethylsiloxane having an average block length ($P_n$) of 10 and a relative solution viscosity of 1.0, prepared with the aid of phenol as chain breaking agent according to DE-OS 3 334 782.

The UV absorbents were incorporated in the polycarbonates in quantities of 0.3% by weight at 290° C. and 80 revs. per min. in a double shaft extruder (ZSK 32, Werner and Pfleiderer) and the extrudate was granulated. Plates measuring 25 cm in length, 5 cm in width and 1 mm in thickness were produced from these compounds in an injection moulding machine ("Idra").

These plates were weathered in a weatherometer of Atlas USA, using a 6.5 W-Xenon burner at a cycle of 102 minutes exposure to light and 18 minutes spraying with demineralised water under conditions of exposure to light. The maximum black body temperature was 60°+/−5° C. The plates were colour matched, in each case after 1000 hours, and to test the toughness under conditions simulating conditions encountered in practice, a modified falling ball test was carried out which had been developed on the basis of DIN 53 443 on multiple web plates. In this test, an impact producing body 5 mm in diameter is used to produce biaxial stresses similar to those produced by a falling hailstone. A falling mass of 36 kg is dropped from a height of 0.2 m at room temperature on the sample bodies which are placed freely on a supporting ring having an internal diameter of 20 mm.

The weathered side of the sample is tested in pressure zones. The fracture pattern (BB) is defined by numbers: 1=splinters, 2=smooth fracture, 3=tough, brittle, 4=tough.

The yellow value determined according to DIN 6167 is used as an indication of the yellowness index (YI).

The results are summarized in the following Table.

| | | | | Weathering Xenon WOM | | | | |
|---|---|---|---|---|---|---|---|---|
| Experiment | UV absorbent | Polycarbonate | Magnitude Measured | 0 h | 1000 h | 2000 h | 3000 h | 5000 h |
| A 1 | 1 | A | YI | 3.10 | 4.84 | 10.18 | 9.25 | 12.62 |
| | | | BB | 4 × 4 | 3 × ½ | 4 × 4 | 4 × 4 | |
| A 2 | 2 | A | YI | 4.72 | 5.57 | 10.74 | 8.72 | 12.68 |
| | | | BB | 4 × 4 | 4 × 3 | 4 × 4 | 4 × 4 | |
| B 1 | 1 | B | YI | 5.65 | 8.51 | 12.73 | 13.82 | 16.74 |
| | | | BB | 4 × 4 | 4 × 4 | 4 × 4 | 4 × 4 | |
| B 2 | 2 | B | YI | 6.90 | 7.84 | 10.66 | 11.16 | 12.86 |
| | | | BB | 4 × 4 | 4 × 4 | 4 × 4 | 4 × 4 | |

The results obtained are as follows:

In the presence of UV absorbent 1, yellowing of the homopolycarbonate is not substantially different from that obtained with absorbent 2. This applies in particular to values obtained for the yellowness index after long exposure to weathering (5000 h values).

The weathering results obtained with the polydiorganosiloxane copolycarbonate are quite different.

When UV absorbent 1 is used, yellowing rises steeply in the course of weathering and after only 2000 hours reaches a value which the homopolycarbonate containing UV absorbent 1 or 2 attains only after 5000 hours of weathering, and UV absorbent 2 provides better protection for the polydiorganosiloxane copolycarbonate so that its yellowing is no more severe than that of the homopolycarbonate.

We claim:

1. A thermoplastic molding composition comprising a polydimethylsiloxane polycarbonate block co-condensate and 0.05 to 1.0 percent by weight of a hydroxybenzotriazole corresponding to

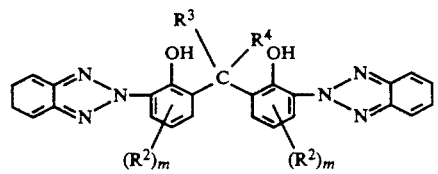

wherein
$R^2$ is a methyl radical
$R^3$ and $R^4$ are hydrogen atoms, and
m is 1.

2. A thermoplastic molding composition comprising
(i) a polydimethylsiloxane-polycarbonate block co-condensate wherein said polydimethylsiloxane is present in an amount of 5 percent relative to the weight of said co-condensate, and
(ii) 0.05 to 1.0 percent by weight of a hydroxybenzotriazole corresponding to

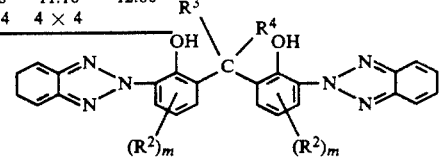

wherein
$R^2$ is a methyl radical,
$R^3$ and $R^4$ are hydrogen atoms and
m is 1.

* * * * *